United States Patent Office 3,247,153
Patented Apr. 19, 1966

3,247,153
REFLECTIVE MARKER
Eduard R. de Vries, Huntingdon, Pa., assignor to Prismo Safety Corporation, Huntingdon, Pa., a corporation of Pennsylvania
No Drawing. Filed Aug. 16, 1962, Ser. No. 217,285
11 Claims. (Cl. 260—29.6)

The present invention relates to reflective marking and more particularly to a reflective marking composition which is immediately retro reflective.

Heretofore retro reflective markers have been made in two principal ways. The first system involved a two-step process wherein the binder was first applied to the surface and while it was still tacky, glass beads were applied thereon so that when the binder had solidified, the glass beads were partially embedded therein and yielded immediately a retro reflective marking. This system has the advantage that the glass beads were immediately exposed but had the disadvantage of being a two-step system. A simpler system involved the preparation of a pre-mix of a mixture of the binder and the glass beads which could be sprayed onto the surface in one step. This system has the disadvantage that when first applied it is not reflex reflective and does not become so until traffic has worn away the exposed coating on the beads near the surface of the marker.

It is therefore an object of the present invention to provide a marking composition which is immediately retro reflective from the time of application and which can be applied by a one-step process.

Another object of the present invention is to provide an immediately retro reflective marking composition for use on signs and other vertical surfaces where there is no abrasion of traffic.

Other objects and the nature and advantages of the instant invention will be apparent from the following description.

In accordance with this invention, reflective spheroids, silvered reflective spheroids and the like are first treated with a silicone solution to render them water repellent and are then dried to yield free flowing water repellent spheroids. The treated free flowing material is then mixed with a water emulsion binder material. This premix is applied in a thin coat on a surface so that a monolayer of the spheroids covers the surface. Because of the water repellent characteristics of the spheroids, the binder on evaporation of the water leaves the top portions of the spheroids exposed whereas the lower portions become embedded in the solidified binder.

Due to the built-in reflectivity of the spheroids, the resulting marker is immediately reflective.

The reflective spheroids referred to herein have been described in detail in copending application Serial No. 61,998, filed October 11, 1960, now abandoned in favor of Serial No. 322,857, filed November 12, 1963, entitled "Reflective Spheroids." These reflective spheroids are generally spherically shaped cured cores of a thermosetting material which are each covered with a plurality of small glass spheres partially embedded in the outer surfaces thereof. The core may be a pigmented composition or in certain instances it can be unpigmented. Particularly good results have been obtained when using as the core composition polyester resin compositions, epoxy resins, thermosetting polystyrene resins, and other thermosetting resins which solidify rapidly.

The reflective spheroids may be made with silvered glass beads partially embedded in the core. The outer exposed silvered surfaces of the partially embedded beads may then be removed by nitric acid treatment or the like. Thus, the resulting silvered reflecting spheroids have glass beads partially embedded therein which are reflectively coated only on their embedded portions. Such spheroids require no reflectivity in the core material used.

The spheroids are first rendered water repellent by treatment with silicone resins which are cured on the spheroids. Not all silicone resins are suitable for this purpose since they do not yield a free-flowing, water repellent product. However, it has been found that good results are obtained when the spheroids are treated with a liquid methyl hydrogen polysiloxane. The curing time and heat for curing the resin can be reduced by use of an amine curing agent or a sodium salt of an organosiliconate as the curing agent. Such methods of treatments of glass beads are disclosed in co-pending applications Serial No. 833,146, filed August 11, 1959, now abandoned, and Serial No. 685, filed January 6, 1960, abandoned in favor of Serial No. 243,744, filed December 11, 1962, Patent No. 3,110,614.

The methyl hydrogen polysiloxane has the general formula:

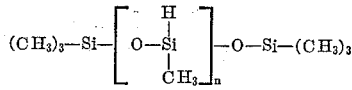

where $n$ is an integer greater than 1, e.g., 2 to 30 or more. A typical polymer of this formula is a fluid having a specific gravity of about 0.98 and having a pH of 7, the value of $n$ averaging about 20 to 30.

As amine curing agents, aliphatic primary, secondary or tertiary amines may be used. Examples are primary alkyl amines such as octylamine; secondary alkyl amines, such as diethylamine; tertiary aliphatic amines exemplified by triethylamine and triethanol amines; and aliphatic polyamines such as ethylene diamine, diethylene triamine, and triethylene tetramine. Heterocyclic and aromatic amines have not been found satisfactory.

The sodium salts of the organosiliconates which have been found useful as curing agents have organo portions which are aliphatic and have a ratio of carbon atoms to silicon atoms of 1.75:1. The water solutions contain approximately 30% solids, −20% silicone and 10% $Na_2O$. These salts are light amber in color, have a specific gravity of 1.21–1.24 and a pH value of 12 to 13. Examples of suitable materials are DC 771.

Excellent results have been obtained by treatment of the reflective spheroids with a mixture of the methyl hydrogen polysiloxane and a dimethyl polysiloxane along with the sodium salt of an organosiliconate as the curing agent. A ratio of 2 parts of the methyl hydrogen polysiloxane to 1 part of dimethyl polysiloxane yields a very high degree of water repellence on the spheroids. The proportions may be varied between ratios of 1:2 to 100:1 of the methyl hydrogen polysiloxane to the dimethyl polysiloxane.

The siloxane resin treating agents are preferably dissolved in a suitable solvent such as toluene, xylol or a chlorinated solvent such as methylene chloride, chloroethylene, carbon tetrachloride, chloroform or the like. The choice of solvent is not critical since it merely serves as a carrier; however, it should be fast evaporating at room temperature, nonflammable, and compatible with the other ingredients.

As a specific example, 100 pounds of reflective spheroids having an average diameter of 10 mils were agitated with 2 ml. sodium organosiliconate, identified as DC 771, and a mixture of 10 grams of methyl hydrogen polysiloxane, identified as DC 1107, and 5 grams of dimethyl polysiloxane, identified as DC 200, diluted with toluene to yield a sprayable consistency. The coated spheroids were found to be water repellent and free flowing after 2–10 minutes at room temperature.

The water repellent free flowing spheroids so obtained are now mixed with a water based emulsion binder. Such water based emulsion binders are widely used in paints for both interior and exterior use and which are water dilutable. Examples of such binders are water emulsions of polyvinyl acetate or polyvinyl acetate chloride. Alkyd resin base water-emulsion type paints may also be employed. An example of such a paint is as follows:

| | Parts by weight |
|---|---|
| Polyvinyl acetate resin in aqueous emulsion | 1426 |
| Water | 300 |

The amount of the water resistant spheroids to be added can vary between 3 to 15 lbs. per gallon of bead-free binder.

This mixture of water repellent spheroids and emulsion binder may be brushed or sprayed onto a surface so that a monolayer of the spheroids results in the solidified binder. It was found that because of the water repellent characteristics of the glass surfaces, upon evaporation of the water, the upper portions of the spheroids were left exposed while the lower portions become embedded in the solidified binder. Thus, the resulting marker, made in a one-step application of a pre-mix, yields an immediately retro-reflective marker. This is contrary to all expectations since it would be assumed that the solidified binder would coat the upper surfaces of the spheroids and would require removal.

It will be obvious to those skilled in the art that various changes may be made without departing from the spirit of the invention and therefore the invention is not limited to what is shown and described in the specification, but only as indicated in the appended claims.

What is claimed is:

1. An immediately retro-reflective marking composition essentially comprising a water based emulsion binder of polyvinyl acetate polymers containing from 3 to 15 pounds per gallon of binder of retro-reflective glass elements which have been previously provided with a cured polysiloxane water repellent coating.

2. A composition in accordance with claim 1 wherein the retro-reflective elements have a coating of a cured methyl hydrogen polysiloxane.

3. A composition in accordance with claim 1 wherein the retro-reflective elements have a coating of a cured mixture of methyl hydrogen polysiloxane and dimethyl polysiloxane.

4. An immediately retro-reflective marking composition essentially comprising a water based emulsion binder of polyvinyl acetate polymers containing from about 3 to 15 pounds per gallon of binder of reflective spheroids, said spheroids each comprising a core of a solidified thermosetting material covered with small glass beads partially embedded in the outer surfaces thereof, said spheroids having been provided with a cured polysiloxane water repellent coating.

5. A composition in accordance with claim 4 wherein the glass beads in the spheroids are each reflectively coated and the reflective coating has been removed from the outer surfaces of the exposed spheres before the spheroids have been provided with the water repellent coating.

6. A composition in accordance with claim 4 wherein the reflective spheroids have a coating of a cured methyl hydrogen polysiloxane.

7. A composition in accordance with claim 5 wherein the reflective spheroids have a coating of a cured methyl hydrogen polysiloxane.

8. A composition in accordance with claim 4 wherein the reflective spheroids have a coating of a cured mixture of methyl hydrogen polysiloxane and dimethyl polysiloxane.

9. A composition in accordance with claim 5 wherein the reflective spheroids have a coating of a cured mixture of methyl hydrogen polysiloxane and dimethyl polysiloxane.

10. A method of preparing an immediately retro-reflective marker which comprises applying a thin layer of a mixture of a water based emulsion binder of polyvinyl acetate polymers containing from 3 to 15 lbs./gallon of binder of retro-reflective glass elements which have been previously provided with a cured polysiloxane water repellent coating onto a base surface, said layer being applied so as to yield a monolayer of said elements in said binder, whereby during drying the water repellent characteristics of said elements cause the water based binder to be shed from the upper surfaces of said elements while the lower surfaces become embedded in the solidified binder.

11. A method in accordance with claim 10 wherein the retro-reflective elements are rendered water repellent by applying a cured coating of a mixture of methyl hydrogen polysiloxane and dimethyl polysiloxane.

References Cited by the Examiner

UNITED STATES PATENTS

| 2,572,252 | 10/1951 | Erasmus | 106—148 |
| 2,588,393 | 3/1952 | Kauppi | 117—124 |
| 2,730,841 | 1/1956 | Searight | 65—21 |
| 2,789,956 | 4/1957 | Eder | 260—46.5 |
| 2,865,266 | 12/1958 | Wynn | 94—1.5 |
| 3,110,614 | 11/1963 | DeVries | 117—124 |
| 3,175,935 | 3/1965 | Vanstrum | 117—100 X |

LEON J. BERCOVITZ, *Primary Examiner.*

DONALD E. CZAJA, *Examiner.*